Oct. 24, 1961  J. E. FLAKER  3,005,651
HAND HOOK
Filed Nov. 19, 1956
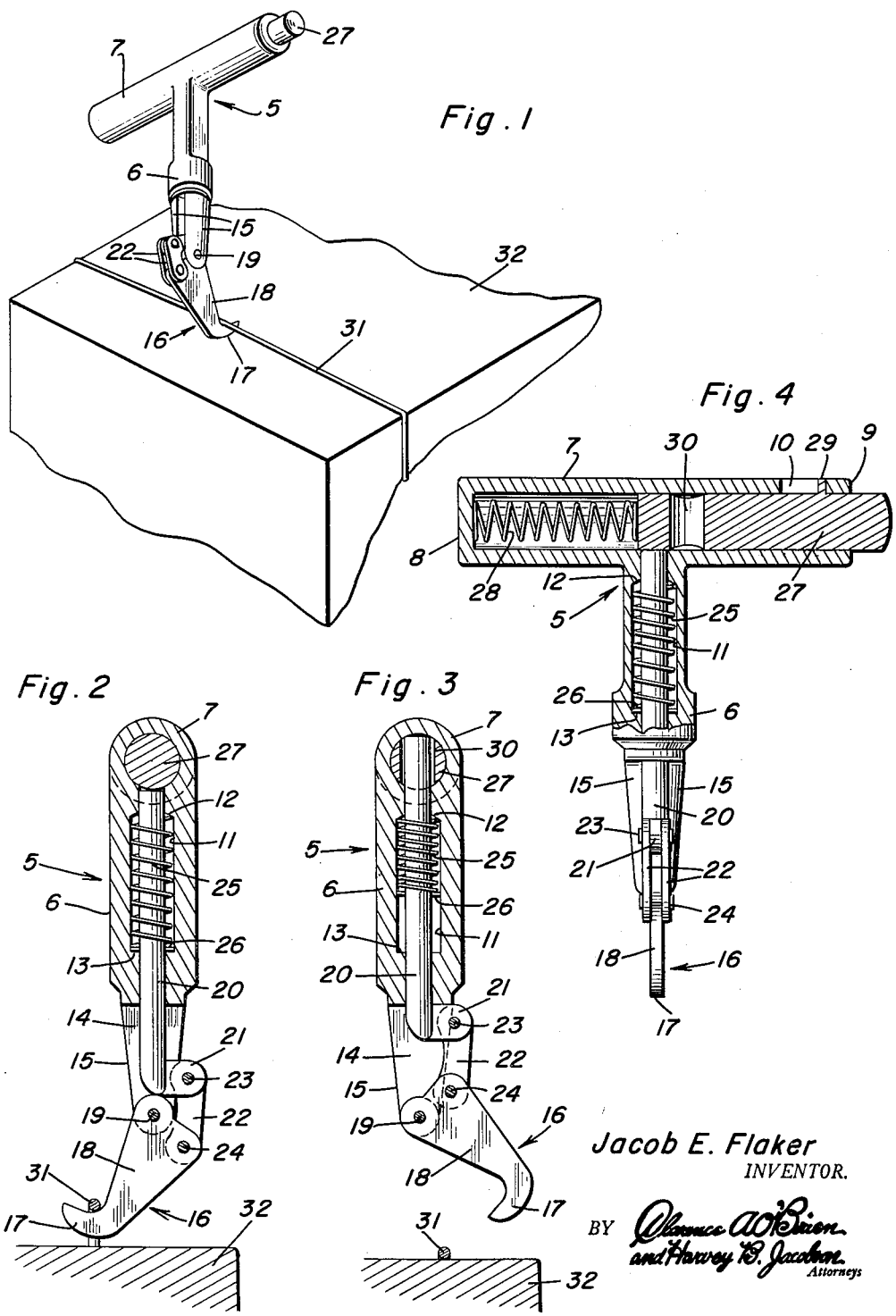
Jacob E. Flaker
INVENTOR.

United States Patent Office 3,005,651
Patented Oct. 24, 1961

3,005,651
HAND HOOK
Jacob E. Flaker, 3483 Greenwich Road, Barberton, Ohio; Cathryn S. Flaker, administratrix of said Jacob E. Flaker, deceased, assignor to Cathryn S. Flaker, Akron, Ohio
Filed Nov. 19, 1956, Ser. No. 622,888
7 Claims. (Cl. 294—26)

The present invention relates to new and useful improvements in hand hooks particularly for handling wire or rope bound bundles, bales, etc., and has for its primary object to provide, in a manner as hereinafter set forth, an implement of this character comprising novel means, controlled by the user, for instantly releasing and dropping the load when desired.

Other objects of the invention are to provide a hand hook of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a hand hook embodying the present invention in use;

FIGURE 2 is a view in vertical section through the device, showing the pivotally mounted load engaging hook in operative position;

FIGURE 3 is a vertical sectional view substantially similar to FIGURE 2 but showing the pivoted hook in retracted or inoperative position; and FIGURE 4 is a vertical sectional view through the device, taken at right angles to FIGURE 2.

Referring now to the drawing in detail, it will be seen that the embodiment of the invention which has been illustrated comprises a substantially T-shaped member of suitable metal which is designated generally by reference character 5. The member 5, which may also be of any desired dimensions, includes a tubular shank 6 having an integral tubular cross handle 7 on its upper end. The tubular shank 6 communicates with the tubular handle 7. As shown to advantage in FIGURE 4 of the drawing, the tubular handle 7 includes closed and open ends 8 and 9, respectively. Adjacent the open end 9 thereof, the tubular handle 7 further includes a longitudinal slot 10 the purpose of which will be presently set forth.

The tubular shank 6 comprises an enlarged intermediate portion 11 providing upper and lower shoulders 12 and 13, respectively. Then, the lower end portion of the tubular shank 6 is slotted, as indicated at 14, in a manner to provide furcations 15.

Journaled for swinging movement between the free or lower end portions of the furcation 15 and depending therefrom is a load engaging hook 16. The hook 16 includes a bill 17 on one end of an elongated, substantially triangular shank 18. The other end portion of the shank 18 is pivotally secured between the furcations 15, as indicated at 19.

A metallic rod 20 is mounted for reciprocation in the tubular shank 6 and adapted to project therefrom into the tubular handle 7. The lower end portion of the rod 20 is operable between the furcations 15 and is provided with a right angularly extending arm 21. A link 22 has one end pivotally connected to the arm 21, as at 23, and its other end pivotally connected to the shank 18 at a point adjacent to but spaced from the pivot 19, as indicated at 24.

The internally enlarged intermediate portion 11 of the shank 6 accommodates a coil spring 25 on the rod 20. The upper end of the spring 25 is engaged beneath the shoulder 12. The lower end of the coil spring 25 is engaged with the projecting end portions of a transverse pin 26 in an intermediate portion of the rod 20 for yieldingly urging said rod downwardly in the shank 6. The shoulder 13 functions as a stop for the pin 26.

Slidably mounted in the tubular handle 7 and projecting from the open end 9 thereof is a metallic plunger 27. A coil spring 28 is mounted under compression in the closed end portion of the handle 7 and engaged with the plunger 27 for yieldingly urging said plunger outwardly. The plunger 27 is provided with a stop pin 29 which is operable in the slot 10. The plunger 27 further includes, in its inner end portion, a vertical opening 30 which is registrable with the tubular shank 6 for the reception of the upper end portion of the rod 20. The pin 29 also secures the plunger 27 against rotation for ensuring registry of the opening 30 with the shank 6 when said plunger is pressed inwardly against the tension of the spring 28.

It is thought that the operation of the device will be readily apparent from a consideration of the foregoing. Briefly, with the upper end of the rod 20 in abutting engagement with the inner end portion of the projected plunger 27, as shown in FIGURES 2 and 4 of the drawing, the hook 16 is positively secured against swinging movement in operative position to be engaged with the binder 31 of the load to be lifted, as indicated at 32. To free the hook 16 to release and drop the load, the user actuates the plunger 27 against the tension of the spring 28 with the thumb of the hand which grips the handle 7. Thus, the opening 30 is brought into registery with the tubular shank 6 for the reception of the rod 20, permitting the hook 16 to swing to inoperative position as shown in FIGURE 3 of the drawing, said rod 20 being moved upwardly against the tension of the spring 25 by the link 22. When the load is released the spring 25 actuates the rod 20 downwardly for automatically returning the hook 16 to operative position. The plunger 27 is then released and is returned to projected position by the spring 28 for again locking the rod 20.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A lifting device comprising: a member including a tubular and generally vertically extending shank and a tubular handle disposed generally normal thereto, said handle being connected to an upper portion of the shank with the interiors of each in communuication with one another, a load engaging hook pivotally mounted on a lower end portion of the shank in jrojecting relation, a rod longitudinally slidable in the shank and operatively connected to the hook at a point offset from the pivot thereof for swinging same to a load engaging position, resilient means connected to the rod for moving it and the hook to the load engaging position, said rod having a portion movable into the handle, and a plunger slidable in the handle and engaged with the rod for preventing movement of the rod into the handle and releasably locking the hook in the load engaging position, said plunger normally projecting from the handle for manual actuation, said plunger being movable out of vertical alignment with the rod for permitting the hook to swing out of a load engaging position upon movement of the plunger, said hook having an upwardly facing load engaging and supporting surface, said surface being shaped and positioned so as to support and retain a load thereon when lifted by said handle and when in the load engaging position, and said surface being shaped and positioned so as to automatically release said load when said plunger is moved out of abutting engagement with said rod.

2. A lifting device comprising: a member including a tubular and generally vertically extending shank and a tubular handle disposed generally normal thereto, said handle being connected to an upper portion of the shank with the interiors of each in communication with one another, a load engaging hook pivotally mounted on a lower end portion of the shank in projecting relation, a rod longitudinally slidable in the shank and operatively connected to the hook at a point offset from the pivot thereof for swinging same to a load engaging position, resilient means connected to the rod for moving it and the hook to the load engaging position, said rod having a portion movable into the handle, and a plunger slidable in the handle and engaged with the rod for preventing movement of the rod into the handle and releasably locking the hook in the load engaging position, said plunger normally projecting from the handle for manual actuation, said plunger being movable out of vertical alignment with the rod for permitting the hook to swing out of a load engaging position upon movement of the plunger, said hook including a cantilevered arm having an upper substantially straight load engaging and supporting surface, the outer portion of said surface extending to a free end of said arm, the inner end of said surface terminating in an upwardly extending surface, said load engaging surface forming an acute angle with a straight line at the rod and extending between a bottom supporting surface of said handle and the inner end of said load engaging and supporting surface when the latter surface is in the load supporting position, and the angle between said straight line and load engaging surface being obtuse when the hook is moved out of the load engaging position.

3. A hand hook of the character described comprising a hollow shank, a hollow handle on the shank, the interior of the handle and shank communicating with each other, a loading engaging hook pivotally mounted on the shank in projecting relation remote from said handle, means carried by said shank and connected to said load engaging hook for retaining said hook in a load engaging position, said means including a rod longitudinally slidably positioned in said shank and connected to said hook, and second means movably carried by said handle and engageable with said rod for selectively releasably locking and releasing said rod and said load engaging hook from said load engaging position, said hook having an upwardly facing load engaging and supporting surface, said surface being shaped and positioned so as to support and retain a load thereon when lifted by said handle and when in the load engaging position, and said surface being shaped and positioned so as to automatically release said load when said plunger is moved out of abutting engagement with said rod.

4. A hand hook of the character described comprising a hollow shank, a hollow handle on said shank, the interiors of the shank and handle communicating with each other, a load engaging hook pivotally mounted on said shank in projecting relation thereto and remote from said handle, means carried by said shank and connected to said load engaging hook for retaining said hook in a load carrying position, said means including a rod longitudinally slidably positioned in said shank and connected to said hook, and second means carried by said handle and engaged with said rod for releasably locking said rod and said load engaging hook in said load carrying position, said second means including a plunger slidably mounted in said handle and directly engaged with said rod, said hook having an upwardly facing load engaging and supporting surface, said surface being shaped and positioned so as to support and retain a load thereon when lifted by said handle and when in the load engaging position, and said surface being shaped and positioned so as to automatically release said load when said plunger is moved out of abutting engagement with said rod.

5. A hand hook of the character described comprising a hollow shank, a hollow handle on said shank, the interiors of the shank and handle communicating with each other, a load engaging hook pivotally mounted on said shank in projecting relation remote from said handle, means carried by said shank and connected to said hook for retaining said hook in an operative position, said means including a rod longitudinally slidably mounted in said shank for projecting into said handle, means carried in said handle engaged with said rod for releasably locking said rod and said load engaging hook in said load carrying position, said second means including a plunger slidably mounted in said handle and engaged with said rod for preventing movement of said rod into said handle, said plunger having an opening for receiving said rod and facilitating movement of said rod and said hook to a load releasing position, said hook having an upwardly facing load engaging and supporting surface, said surface being shaped and positioned so as to support and retain a load thereon when lifted by said handle and when in the load engaged position, and said surface being shaped and positioned so as to automatically release said load when said plunger is moved out of abutting engagement with said rod.

6. An implement of the character described comprising a substantially T-shaped member including a tubular shank and a tubular handle disposed at right angles thereto, said handle being connected to one end of said shank with its interior in communication with the interior of said shank, said handle being closed at one end and open at its other end, a load engaging hook pivotally mounted on the other end portion of said shank in projecting relation, a rod longitudinally slidable in said shank and connected to said hook for swinging said hook to a load carrying position, said rod being movable into the interior of said handle, and a plunger slidably mounted in said handle and engaged with said rod for preventing movement of said rod into said handle and in one position releasably locking said hook in the load carrying position, said plunger projecting from the open end of said handle for manual actuation, said hook having an upwardly facing load engaging and supporting surface, said surface being shaped and positioned so as to support and retain a load thereon when lifted by said handle and when in the load engaging position, and said surface being shaped and positioned so as to automatically release said load when said plunger is moved out of abutting engagement with said rod.

7. An implement of the character described comprising a substantially T-shaped member including a tubular shank and a tubular handle disposed at right angles thereto, said handle being connected to one end of said shank with its interior in communication with the interior of said shank, said handle being closed at one end and open at its other end, a load engaging hook pivotally mounted on the other end portion of said shank in projecting relation, a rod longitudinally slidable in said shank and connected to said hook for swinging said hook to a load carrying position, said rod being movable into said handle interior, and a plunger slidably mounted in said handle and engaged with said rod for preventing movement of said rod into said handle and releasably locking said hook in the load carrying position, said plunger projecting from the open end of said handle for manual actuation, said plunger having an opening therein for the reception of the rod for facilitating the movement of the hook to a load releasing position, said hook having an upwardly facing load engaging and supporting surface, said surface being shaped and positioned so as to support and retain a load thereon when lifted by said handle and when in the load engaging position, and said surface being shaped and positioned so as to automatically release said load when said plunger is moved out of abutting engagement with said rod.

References Cited in the file of this patent

UNITED STATES PATENTS

| | | |
|---|---|---|
| 1,004,297 | Nygren | Sept. 26, 1911 |
| 2,138,694 | Daugherty | Nov. 29, 1938 |
| 2,575,986 | Yoder | Nov. 20, 1951 |
| 2,628,857 | Nelson | Feb. 17, 1953 |
| 2,631,882 | Satre | Mar. 17, 1953 |
| 2,772,111 | Eide | Nov. 27, 1956 |
| 2,785,920 | Barnes | Mar. 19, 1957 |